United States Patent [19]

Khanarian et al.

[11] Patent Number: 5,021,268
[45] Date of Patent: Jun. 4, 1991

[54] METHOD OF MAKING ASYMMETRIC LANGMUIR-BLODGETT FILMS

[75] Inventors: Garo Khanarian, Berkeley Heights; James B. Stamatoff, Westfield; Alan Buckley, Berkeley Heights, all of N.J.

[73] Assignee: The United States of America as represented by the Secretary of the Air Force, Washington, D.C.

[21] Appl. No.: 467,830

[22] Filed: Jan. 17, 1990

[51] Int. Cl.⁵ .............................................. B05D 1/20
[52] U.S. Cl. ................................. 427/430.1; 118/402
[58] Field of Search ...................... 427/430.1; 118/402

[56] References Cited

U.S. PATENT DOCUMENTS

| | | | |
|---|---|---|---|
| 4,511,604 | 4/1985 | Barraud | 118/402 |
| 4,599,969 | 7/1986 | Barraud et al. | 118/429 |
| 4,645,693 | 2/1987 | Roberts et al. | 427/402 |
| 4,646,678 | 3/1987 | Grunfeld | 118/667 |
| 4,674,436 | 6/1987 | Miyazaki et al. | 118/402 |
| 4,722,856 | 2/1988 | Albrecht et al. | 427/402 |
| 4,779,562 | 10/1988 | Ono | 118/402 |
| 4,783,348 | 11/1988 | Albrecht et al. | 427/402 |
| 4,840,821 | 6/1989 | Miyazaki et al. | 427/430.1 |
| 4,848,270 | 7/1989 | Wakayama et al. | 427/430.1 |

*Primary Examiner*—Shrive Beck
*Attorney, Agent, or Firm*—Irwin P. Garfinkle; Donald J. Singer

[57] ABSTRACT

A method is disclosed which uses the Langmuir-Blodgett method to coat a substrate with multiple monomolecular single layers by immersing the substrate through a first layer of a first enclosure of a tank having first and second enclosures on a common subphase, and then withdrawing the substrate through a second layer in the second enclosure. The steps are repeatable to provide as many different single layers as required.

1 Claim, 1 Drawing Sheet

METHOD OF MAKING ASYMMETRIC LANGMUIR-BLODGETT FILMS

STATEMENT OF GOVERNMENT INTEREST

The invention described herein may be manufactured and used by or for the Government for governmental purposes without the payment of any royalty thereon.

BACKGROUND OF THE INVENTION

This invention relates to a method of making asymmetric Langmuir-Blodgett films by depositing monomolecular layers on a substrate. More specifically, this invention comprises a method for depositing two or more different monomolecular layers onto a substrate.

Monomolecular layers of organic compounds find a large number of applications, especially in the field of electronics. For example, monomolecular layers are used in forming metal-insulator-metal structures in which the thickness of the dielectric insulator layer must be controlled with a particularly high degree of accuracy.

One known method for producing and depositing monomolecular layers of amphiphillic molecules is the well known Langmuir-Blodgett method, described in the Journal of The American Chemical Society, Volume 57 (1935) pages 1007-1010.

The Langmuir-Blodgett method consists of forming a monomolecular layer at the surface of a tank filled with a liquid subphase such as water. In the Langmuir-Blodgett method a solution of amphiphillic molecules dissolved in a solvent which is not miscible with the subphase liquid in the tank is spread onto the liquid surface. Amphiphillic molecules are those having a hydrophobic first end and a hydrophiphillic second end lined up side by side in a particular direction. When the solvent evaporates a loosely packed monomolecular layer is formed on the surface of the subphase. A transition of the monomolecular layer thus formed from a state of gas or liquid to a solid state is then achieved by reduction of the surface area of the layer by compressing it to a predetermined surface pressure. The resulting monomolecular layer is deposited onto the surface of a substrate by passing the substrate through the compressed layer while maintaining the layer at a predetermined surface pressure during the period of deposition.

A standard method for compressing the monomolecular layer consists of using a leak tight moving barrier which moves over the liquid surface of the tank. By displacing the barrier, the area of the monomolecular layer which had previously been formed at the liquid surface of the tank is reduced to bring the layer to the desired surface pressure.

In a conventional Langmuir-Blodgett system, the substrate is passed through the monomolecular layer on the surface of the subphase to coat the substrate with a single layer. On the return trip through the subphase, a second layer is applied, and this second layer is undesirable for many applications. In the method provided in accordance with this invention, the substrate is passed through each of a plurality of monomolecular layers in only one direction, so that only a single coating of a particular layer is applied.

Other Langmuir-Blodgett systems are described in a number of U.S. Patents. For example, Albrecht et al U.S. Pat No. 4,722,856 discloses a system for maintaining the pressure of a monomolecular layer on the surface of a subphase substantially constant. Barraud et al U.S. Pat. No. 4,599,969 discloses a tank with a single trough having a movable barrier for controlling surface pressure of the monomolecular layer. The mechanical arrangement of Barraud's barrier would be suitable for use in each of the troughs used in accordance with this invention. Ono, U.S. Pat. No. 4,779,562 shows a system in which the substrate is held fixed while the subphase is raised, thereby eliminating the need for lowering and raising the substrate.

None of the known prior art uses a two trough system in which the substrate is first coated with a single monomolecular layer by first immersing the substrate through a layer on the surface of a common subphase in one of the troughs, then moving the substrate laterally below the surface to the second trough, where it is coated with a second different layer by withdrawing the substrate from the subphase and through the second layer.

SUMMARY OF THE INVENTION

This invention is a modification of the Langmuir-Blodgett method in that it uses a multiple enclosure system in which different monomolecular layers are contained in each enclosure on the subphase surface, and the substrate is coated with each layer by passing the substrate through the layer in only one direction. In the example shown, the system uses multiple enclosures on a common water based subphase. The areas of the enclosures are varied independently of each other by means of leak tight movable barriers which function independently to vary the surface pressure of each monomolecular layer. A vertically oriented substrate is first lowered through the surface layer in a first enclosure. The substrate is then moved laterally beneath the surface of the subphase into a second enclosure where the substrate is elevated out of the subphase and through second monomolecular layer. Depending on the system requirements, the process may be repeated by returning the substrate to its first position, or it may be moved to other enclosures on the same or different subphases.

BRIEF DESCRIPTION OF THE DRAWINGS

For a better understanding of the nature of this invention, reference should now be made to the following specification and to the accompanying drawing in which.

DETAILED DESCRIPTION OF A PREFERRED EMBODIMENT

Figure 1:
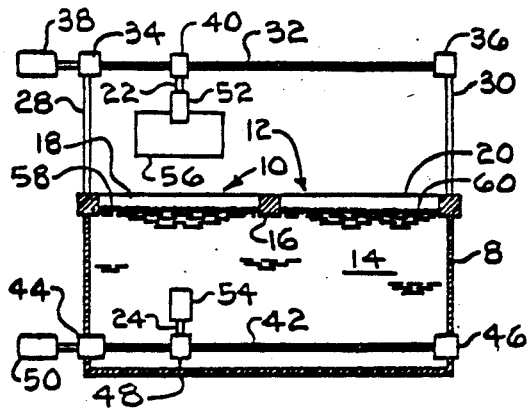
FIGS. 1-4 show the various step performed in coating a substrate in accordance with this invention.

The schematic diagrams illustrated in FIGS. 1-5 are for the purpose of describing the method which is the subject matter of this invention and should not be construed as a preferred embodiment of the apparatus which may be required. Such apparatus can be designed and installed by persons skilled in the mechanical arts, and form no part of the present invention. FIGS. 1-4 show the apparatus in four different positions in the operation of the method.

The illustrated apparatus comprises a tank 8 divided into two enclosures (or troughs) 10 and 12 on a common water base subphase 14. The areas of the enclosures 10 and 12 are separated by a stationary wall 16 that extends from above the surface of the water base subphase 14 to a shallow depth below. The area of each enclosure 10 and 12 is independently varied by means of movable barriers 18 and 20, respectively. Changing the area of the enclosures by moving the barriers serves to change the surface pressure.

The system requires two movable arms, an upper arm 22 and a lower arm 24 positioned, respectively, above and below the surface of the subphase 14. To function within the system, the arms 22 and 24 must be capable of being lowered and raised, and in addition must be movable from enclosure 10 to enclosure 12 without disturbing the surface of the subphase. The arms 22 and 24 must be extendable and retractable, and therefore, may advantageously be telescoped by any suitable mechanism (not illustrated). For moving the arm 22 from one enclosure to the other, we show a pair of shaft supports 28 and 30 which support a threaded shaft 32 above the tank 8 in bearings 34 and 36. The shaft 32 is rotated by means of a reversible electric motor 38.

The shaft 32 passes through a mechanism 40 from which the arm 22 is mounted. When the shaft 32 is rotated in one direction, the arm 22 is moved from its first position over enclosure 10, to its second position over enclosure 12. The mechanism 40 also serves to raise and lower the arm 22. A lower threaded shaft 42 is located below the surface of the subphase and supported across the tank 8 in bearings 44 and 46. The shaft 42 carries arm 24 from a mechanism 48 which serves, when the shaft is rotated in one direction or the other by reversible motor 50, to move the arm 24 across the tank below the surface of the subphase. The mechanism 48 also serves on command to extend or retract the arm 24.

The arms 22 and 24 carry clips 52 and 54 which function to hold and transfer a substrate 56 during the coating process. A monomolecular layer 58, deposited in accordance with the Langmuir-Blodgett method is deposited on the surface of the subphase 14 in enclosure 10, while a different monomolecular layer 60 is deposited on the surface of the subphase 14 in the enclosure 12.

METHOD OF OPERATION

Figure 2:
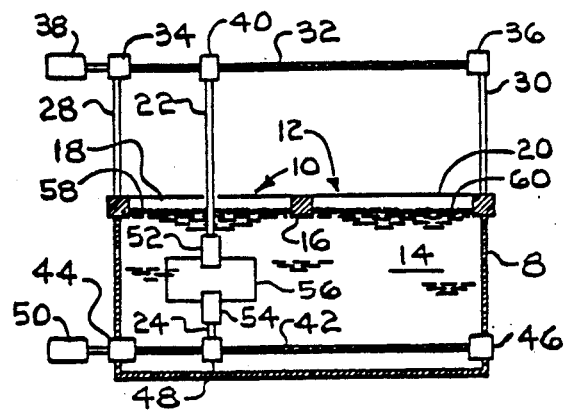

Initially, as seen in FIG. 1, the surface pressures of each of the monomolecular layers 58 and 60 on the surface of the subphase in the respective containers 10 and 12 is adjusted to a desired level by moving the leak proof barriers 18 and 20. A planar substrate 56 which is to be coated with the two monomolecular layers 58 and 60 is held in a vertical position over the enclosure 10 by the clip 52 at the end of arm 22. At the same time, the clip 54 of arm 24 is positioned below the surface of the subphase in vertical alignment with the clip 52 on the end of the arm 24. As seen in FIG. 2, the arm 22 is then extended until such time as the substrate is latched by the clip 54 of the arm 24. The arm 22 is then retracted so that it is above the surface of the substrate 14.

Figure 3:
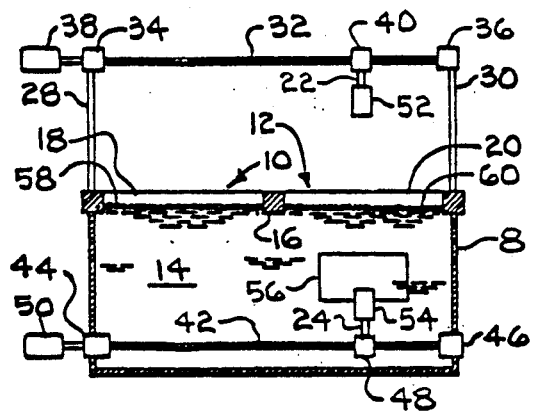
Figure 4:
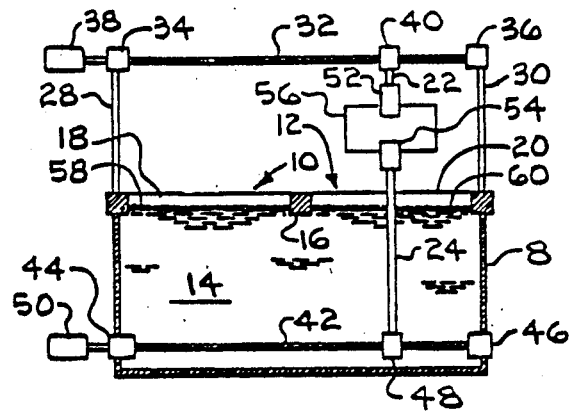
Figure 5:
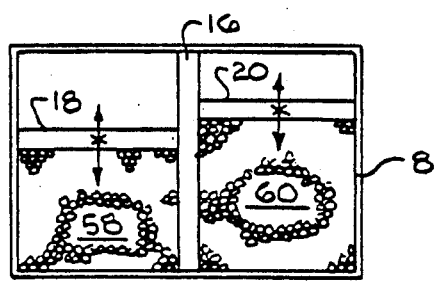
FIG. 5 is a plan view showing the overall layout of the apparatus.

Next, both motors 38 and 50 are energized to derive the respective shafts 32 and 42, which, in turn moves the arms 22 and 24 to the enclosure 12, the substrate 56 making the transfer from the first enclosure to the second while it is held by the latch 54 entirely below the subphase surface with its planar surface parallel tot he direction of motion. This is illustrated in FIG. 3. Thereafter, as seen in FIG. 4, the arm 24 is extended, raising the substrate 56 until it is latched by the latch 52. The arm 24 is then retracted and both arms may be returned to their initial positions where the process may be repeated.

Thus, with the described method, a substrate may be coated with a first single layer of a first monomolecular layer and then a second single layer of a second monomolecular layer. Repeating the process will add successive alternating single layers.

While the disclosed embodiment uses only 2 enclosures, there is no reason why 3, 4 or more enclosures could not be used in circumstances where other arrangements of monomolecular coatings are desired. While the disclosed embodiments provides the capability of coating a substrate with coatings A and B, repeated as often as required, a three container system could provide coating A, B and C, and so on.

In summary, this invention provides a method that uses the Langmuir-Blodgett method to coat a substrate with multiple monomolecular single layers by immersing the substrate into a multiple enclosure tank having a common subphase to coat the substrate with one monomolecular layer, and the withdrawal the substrate through a second layer in a second enclosure.

It is apparent to persons skilled in the art that this invention is subject to various modifications and adaptations without departing from its spirit. It is our intention therefore, that this invention be limited only by the following claims as interpreted in the light of the prior art.

What is claimed is:

1. In a system for depositing multiple monomolecular layers of amphiphillic molecules on a substrate, said system including a tank having multiple enclosures on a common subphase, said system also including first and second substrate support means, said first substrate support means being located entirely above the surface of said subphase, said second substrate support means being located entirely below the surface of said subphase, said substrate initially being supported by said first substrate support means and, the molecules in each enclosure being compressed independently of the molecules in other enclosures, the method comprising the steps of:

a. immersing said substrate through said molecules in a first of said enclosures and into said subphase;
   b. transferring said substrate from said first substrate support means to said second substrate support means;
   c. moving said second substrate support means and said substrate below the surface of said subphase to a second of said enclosures; and
   d. withdrawing said substrate from said subphase through the molecules on the surface of the subphase of said second enclosure, whereby the surface of said subphase is undisturbed except by said substrate moving therethrough.

* * * * *